United States Patent
Yi et al.

(10) Patent No.: US 9,961,654 B2
(45) Date of Patent: May 1, 2018

(54) METHOD AND APPARATUS FOR PERFORMING SYNCHRONIZATION IN WIRELESS COMMUNICATION SYSTEM

(71) Applicant: LG ELECTRONICS INC., Seoul (KR)

(72) Inventors: Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 14/770,242

(22) PCT Filed: Mar. 17, 2014

(86) PCT No.: PCT/KR2014/002231
§ 371 (c)(1),
(2) Date: Aug. 25, 2015

(87) PCT Pub. No.: WO2014/142628
PCT Pub. Date: Sep. 18, 2014

(65) Prior Publication Data
US 2016/0007310 A1 Jan. 7, 2016

Related U.S. Application Data

(60) Provisional application No. 61/786,820, filed on Mar. 15, 2013, provisional application No. 61/808,209, filed on Apr. 3, 2013.

(51) Int. Cl.
*H04W 84/12* (2009.01)
*H04W 56/00* (2009.01)

(52) U.S. Cl.
CPC ..... *H04W 56/0015* (2013.01); *H04W 56/001* (2013.01)

(58) Field of Classification Search
CPC ..... H04W 84/12; H04W 80/04; H04W 84/18; H04W 88/06; H04W 74/08
See application file for complete search history.

(56) References Cited

U.S. PATENT DOCUMENTS

2009/0249153 A1 10/2009 Zhang
2010/0034135 A1* 2/2010 Kim ............... H04B 7/2606
370/315

(Continued)

FOREIGN PATENT DOCUMENTS

KR 10-2012-0095398 A 8/2012
WO 2011-056119 A1 5/2011

OTHER PUBLICATIONS

ZTE, "Macro NodeB muting for DL interference coordination", R1-125136, 3GPP TSG RAN WG1 Meeting #71, New Orleans, USA, Nov. 12-16, 2012.

*Primary Examiner* — Hassan Phillips
*Assistant Examiner* — Prenell Jones
(74) *Attorney, Agent, or Firm* — Dentons US LLP

(57) ABSTRACT

A method for and apparatus for performing synchronization in a wireless communication system is provided. A wireless device receives information including a set of subframes in which a discovery signal or a synchronization signal is transmitted, and a muting pattern which is changed according to a downlink (DL)/uplink(UL) configuration of a corresponding cell; receives the discovery signal or the synchronization signal from a cell based on the information; and performs synchronization, wherein the information is indicated to cells via air interface from a source cell.

13 Claims, 14 Drawing Sheets

(a) Gap due to mis alignment (b) overlap due to mis alignment

(56) References Cited

U.S. PATENT DOCUMENTS

| | | | |
|---|---|---|---|
| 2010/0075704 A1* | 3/2010 | McHenry | H04W 16/14 455/509 |
| 2010/0080139 A1* | 4/2010 | Palanki | H04B 7/2606 370/252 |
| 2011/0105144 A1 | 5/2011 | Siomina et al. | |
| 2011/0235743 A1 | 9/2011 | Lee et al. | |
| 2012/0082052 A1* | 4/2012 | Oteri | H04W 24/10 370/252 |
| 2013/0235769 A1* | 9/2013 | Yuan | H04L 25/0202 370/280 |

* cited by examiner (a)

(b)

(a) Sync within the cluster    (b) Sync with the macro cell (a) Gap due to mis alignment (b) overlap due to mis alignment

METHOD AND APPARATUS FOR PERFORMING SYNCHRONIZATION IN WIRELESS COMMUNICATION SYSTEM

This application is a 35 USC § 371 National Stage entry of International Application No. PCT/KR2014/002231 filed on Mar. 17, 2014, which claims priority to U.S. Provisional Application No. 61/786,820, filed on Mar. 15, 2013, and U.S. Provisional Application No. 61/808,209, filed on Apr. 3, 2013, all of which are incorporated by reference in their entirety herein.

TECHNICAL FIELD

The present invention relates to wireless communications, and more particularly, to a method and apparatus for performing synchronization in a wireless communication system consisting of multiple carriers over single frequency or multiple frequencies.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted or eliminated controls and RS signals, and further UE's operation in a small cell cluster environment need to be defined. The efficient operation includes handling synchronization for small cells.

DISCLOSURE

Technical Problem

The present invention provides a method and apparatus for performing synchronization in a wireless communication system.

The present invention also provides a method and apparatus for sharing synchronization timing and pattern in a wireless communication system.

Technical Solution

In an aspect, a method for performing a synchronization in a wireless communication system is provided. The method may include acquiring information including a set of subframes in which a discovery signal or a synchronization signal is transmitted, and a muting pattern which is changed according to a downlink (DL)/uplink(UL) configuration of a corresponding cell; receiving the discovery signal or the synchronization signal from a cell based on the information; and performing synchronization, wherein the information is indicated to cells via air interface from a source cell.

In another aspect, a wireless device for performing a synchronization in a wireless communication system is provided. The wireless device includes a radio frequency (RF) unit for transmitting and receiving a radio signal; and a processor operatively coupled to the RF unit, wherein the processor is configured for: acquiring information including a set of subframes in which a discovery signal or a synchronization signal is transmitted, and a muting pattern which is changed according to a downlink (DL)/uplink(UL) configuration of a corresponding cell; receiving the discovery signal or the synchronization signal from a cell based on the information; and performing synchronization, wherein the information is indicated to cells via air interface from a source cell.

Advantageous Effects

The proposed embodiment supports more efficient synchronization with dynamic coverage by small cell conditions. Especially, the proposed embodiment supports to share transmission timing and pattern in a small cell and a macro cell environment which are connected via air interface.

MODE FOR INVENTION

Figure 1:
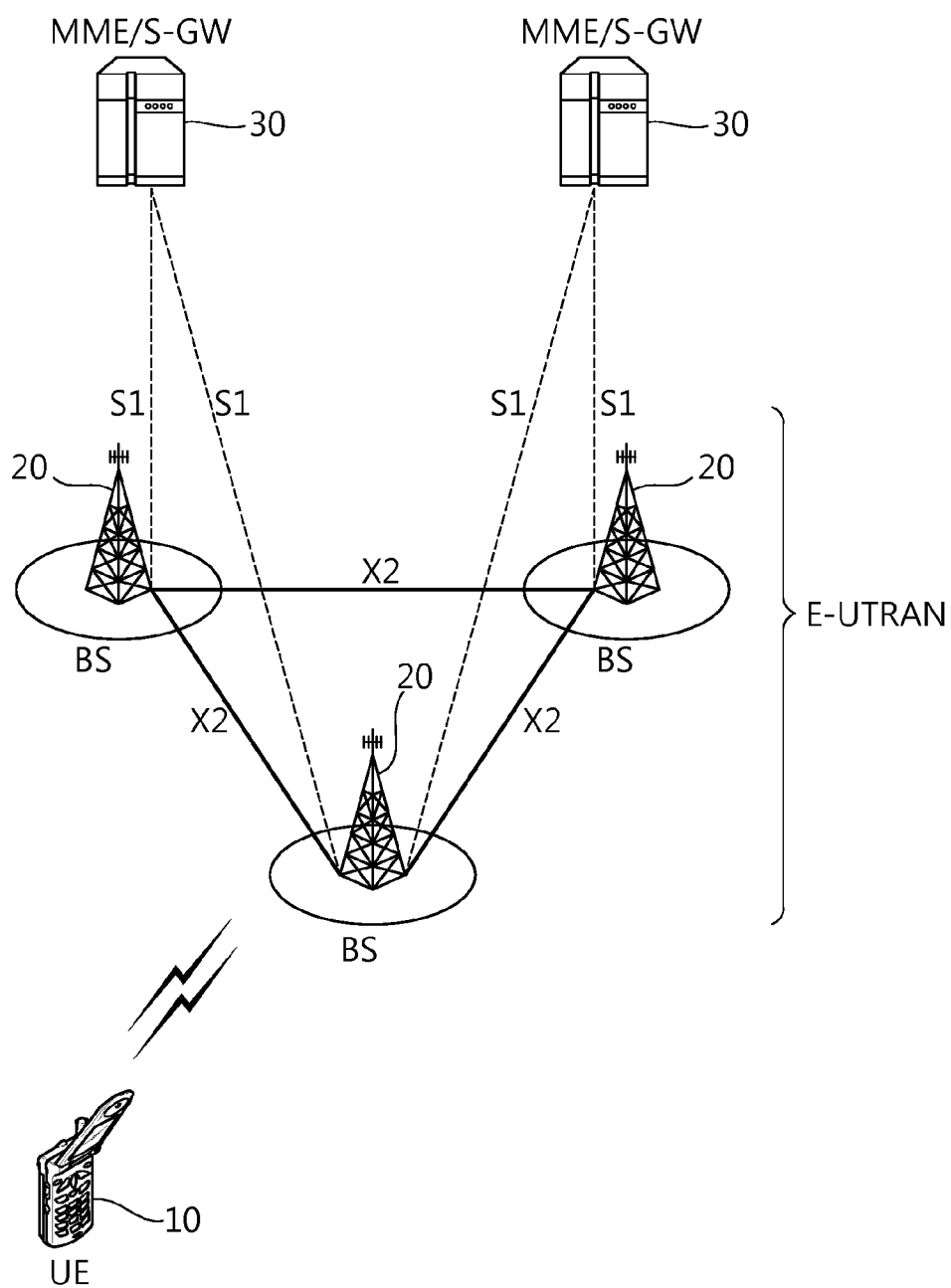
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) explains. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
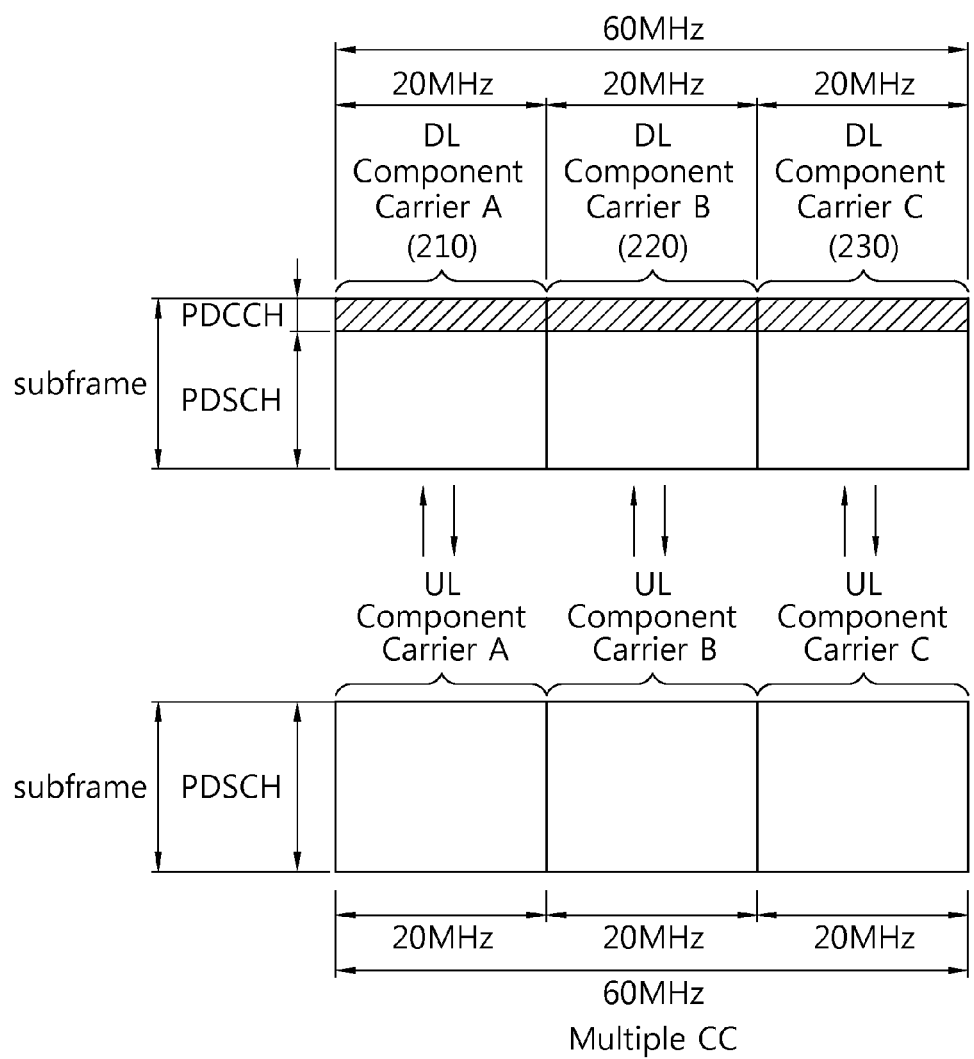
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the DL/UL subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a Pcell (primary serving cell) is a resource in which the UE initially establishes a connection (or a RRC connection) among several serving cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (secondary serving cell) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
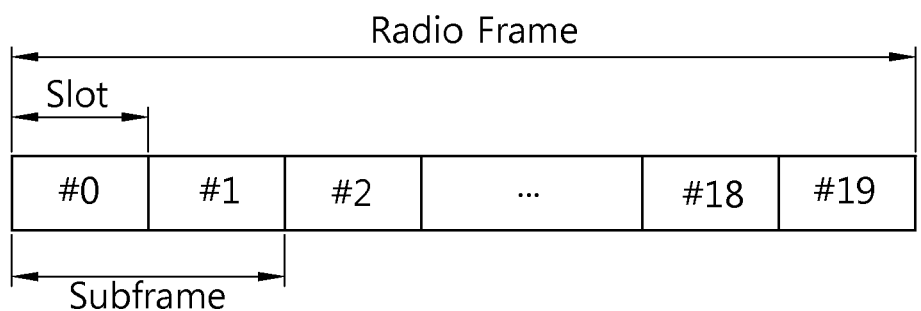
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain. The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Figure 4:
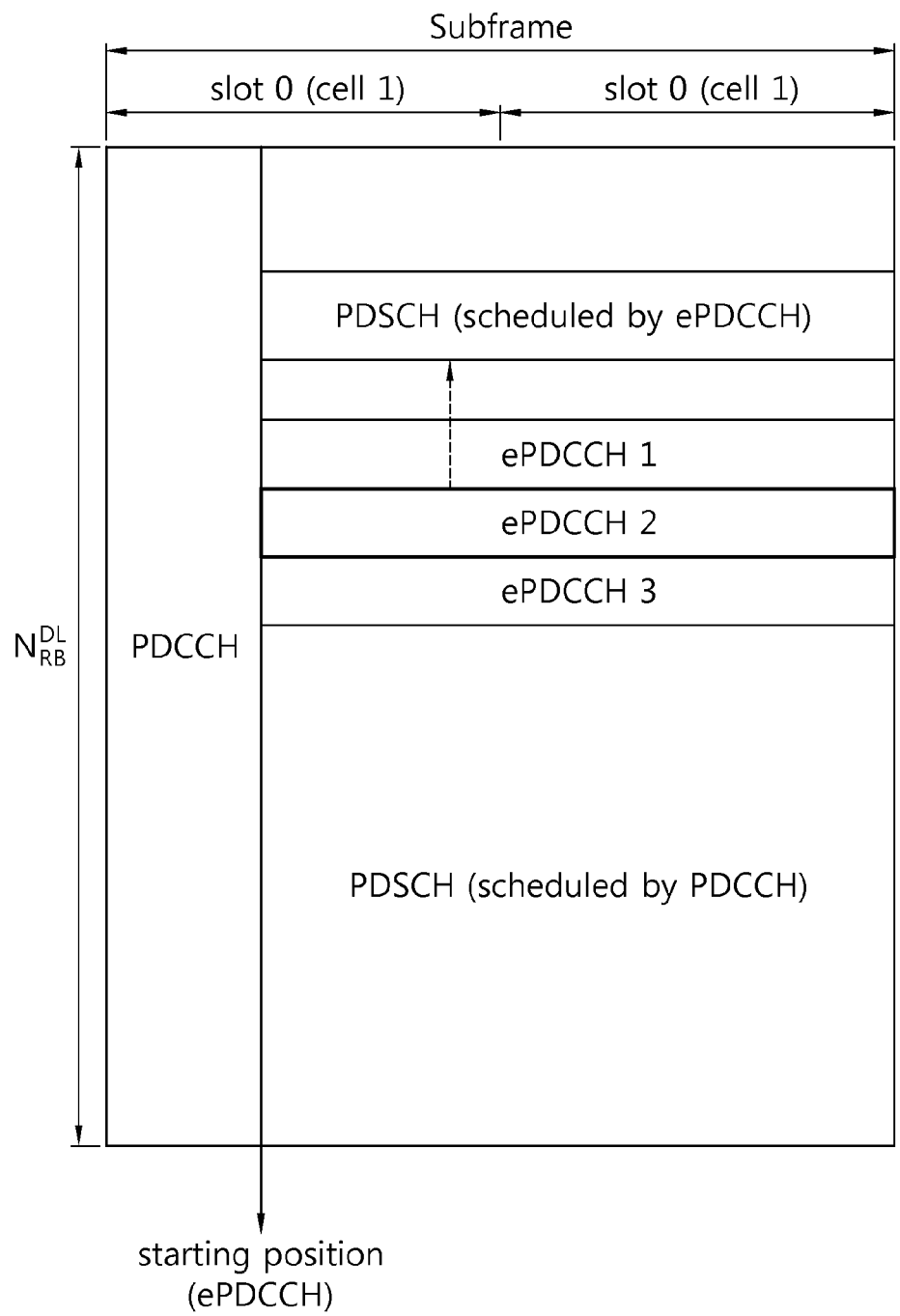
FIG. 4 shows downlink control channels to which the present invention is applied.

Herein, an ePDCCH can be one of solutions of limitation for a PDCCH transmission or new control information transmission of near future commination system including a new type of carrier as shown in FIG. 4. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted.

For this next LTE system or enhanced communication system, this proposed embodiment provides that the new carrier cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features. Even though the proposed invention is mainly described for the new carrier cell as an example, it does not limit to the new carrier cell only. It can be applied to legacy carriers without the loss of generality as well. More details, this invention considers cases where cell-specific RS used for tracking and the Radio Resource Management (RRM) measurement would not be transmitted at all or transmitted only a subset of subframes different from legacy carrier. For a convenience, this invention shows an example where CRS or tracking RS is transmitted every 5 msec e.g., subframe #0 and #5 in each radio frame. More particularly, a new carrier may refer a carrier which performs cell on/off where eNB turns off transmissions upon no active UE attached or based on a pattern. If this is assumed, this invention shows an example where PSS/SSS/CRS or a discovery signal based on CSI-RS is transmitted every T msec with a predetermined value e.g., T=200, or more than 200.

This proposed embodiment also supports an efficient transmission within a small cell cluster. More specifically, a dual connectivity for data flow and macro/small cell carrier-aggregation (CA), inter-site CA, or UE is connected to a small cell which belongs to a small cell cluster assuming a dense small cell deployment is supported.

Figure 5:
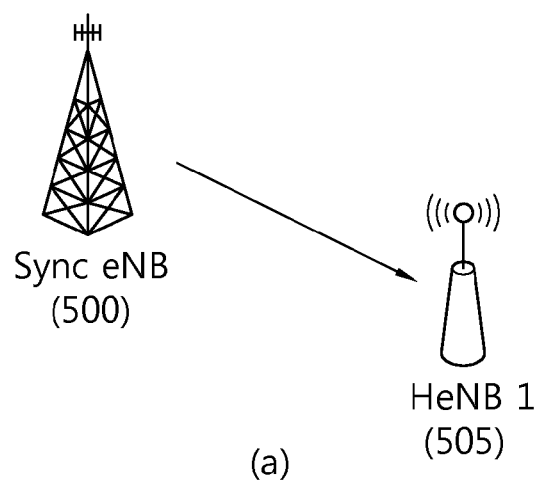
FIG. 5 shows an example of synchronization using a network listening which the present invention is applied.
Figure 5:
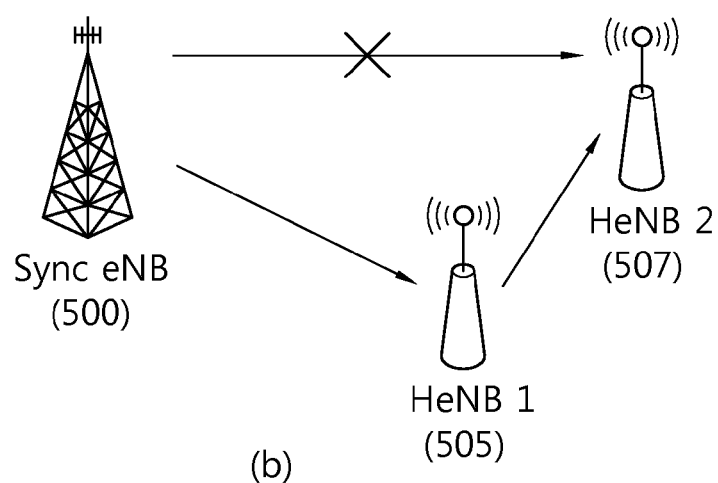

FIG. 5 shows an example of synchronization using a network listening which the present invention is applied.

Referring to FIG. 5, small cells are isolated when macro coverage is not assumed, the cell may declare itself as a cluster master and form a small cell cluster. Once a small cell cluster is formed, network synchronization is performed within the cluster. This proposed embodiment focuses on network synchronization techniques based on a scheme of network listening.

Thus, cells within a cluster can hear each other via air interface either directly or via multi-hop. The multi-hop is used that two or more wireless nodes hops to convey information from a source to a destination.

The information includes synchronization information to perform synchronization. Also the synchronization information includes information of the sync node such as the macro cell's cell information, system band, and frequency. And TA value for the synchronization can be included, the TA values further has a list including an offset between macro cells, a macro cell and a cluster master, or a cluster master and hopped cells. Also offset power of a cell to set up or down to reduce interference can be included. It can be included with a muting/TX (or RX) pattern for coordinated cells.

For example, the Sync eNB (500) is a cluster master and it sends the synchronization information detected by the macro cell to HeNB (505), the HeNB and Sync eNB can configure a small cell cluster. Also the Sync eNB (500) controls that HeNB 1(505) sends the synchronization information delivered to HeNB 2(507). Meanwhile, cells within a cluster may not hear each other via air interface among themselves. For this case, this proposed embodiment shows performing synchronization in an isolated small cell cluster environment.

Figure 6:
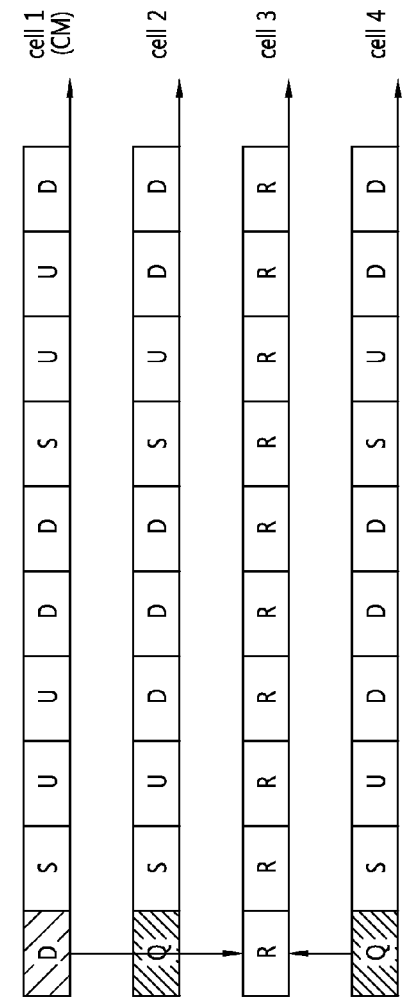
FIG. 6 shows an example of performing synchronization which the present invention is applied.
Figure 6:
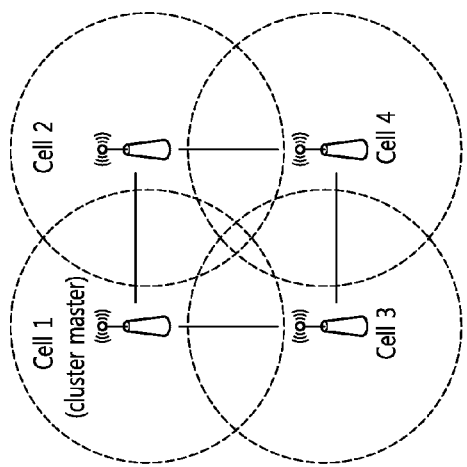

FIG. 6 shows an example of performing synchronization which the present invention is applied.

Referring to FIG. 6, information about cluster master shall be given or shared to cells within the small cell cluster. The information can be given via backhaul interface, the interface includes air interface, and the information includes synchronization pattern and timing information of the cluster master.

level including a network level. Those subframes can be used for first-tier nodes which are reachable by the cluster master in one-hop. Those cells can be a listening mode to get re-synchronization.

Also, a cluster master may define the maximum supportable stratum level by the network listening technique, which will be propagated via backhaul signaling. This may determine the threshold of SINR per hop and also used for determining whether a target eNB can be synchronized or not upon receiving a network listening RS from a source eNB. For example, if the source eNB's stratum level already reaches the maximum supportable stratum level, even though the target eNB can listen on the source eNB, it may not be able to assume it can be synchronized as the stratum level exceeds the supportable stratum level.

Herein, the supported DL/UL configuration are listed in Table 2, where for each subframe in a radio frame, D denotes the subframe is reserved for downlink transmissions, U denotes the subframe is reserved for uplink transmissions, and S denotes a special subframe with the three fields DwPTS, GP and UpPTS as Table 1. DL/UL configuration with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. The UpPTS and the subframe immediately following the special subframe are always reserved for uplink transmission. In case multiple cells are aggregated, the UE may assume the same uplink-downlink configuration across all the cells and that the guard period of the special subframe in the different cells have an overlap of at least $1456 \cdot T_s$.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Each small cell, upon waking up, firstly attempts to be synchronized with a cluster master by listening subframes until network synchronization is completed. Via backhaul, the subframe configuration of the cluster master may be given to the small cells. For example, cell 3 wakes up and listens to the signals from cells. Upon detecting synchronization signals or discovery signals from the cluster master, it can be synchronized.

For a periodic sync-up process, a cluster master may define a set of subframes where 'discovery signals' or 'synchronization signals' may be transmitted which will be used for network sync-up. For the sync-up process, the master cell sends DL/UL configuration to cell 3 or a stratum

TABLE 2

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 2-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

Subframes used for first-tier nodes and third-tier nodes can be defined by the cluster master or offset may be used. For example, if cluster master is sending synchronization signals at the first subframe of every 5 radio frames, the first tier node may transmit its signal at 6th subframe of every 5 radio frames and second tier node may transmit its signal at 11th subframe of every 5 radio frame and so on.

In this case, the offset value is 5 which may be signaled by the cluster master via backhaul. To allow better synchronization and tracking performance, other cells may be silent in the subframes where synchronization is occurred. For example, all cells except for cluster master within a cluster may be silent in the first subframe of every 5 radio frames for the cluster master sync transmission and cells except for first tier cells may be silent in the 6th subframe of every 5 radio frames. The master cell uses DL/UL configuration of 0, the cell 2 and cell 4 is silent at determined subframes by the DL/UL configuration of 0 to synchronize between cell 3 and the master cell. When the cell 4 performs synchronization, the cell 4 is received the synchronization information from the cell 2, the synchronization information is delivered from the master cell1 which is forwarded to cell 2, it includes the stratum level as 2.

If there is no path from a cluster master to a cell within a cluster, either the cell participates in another cluster or becomes cluster master in this case. Alternatively, if there are UEs connecting cells, UE can behave as if a small cell to perform network synchronization.

Figure 7:
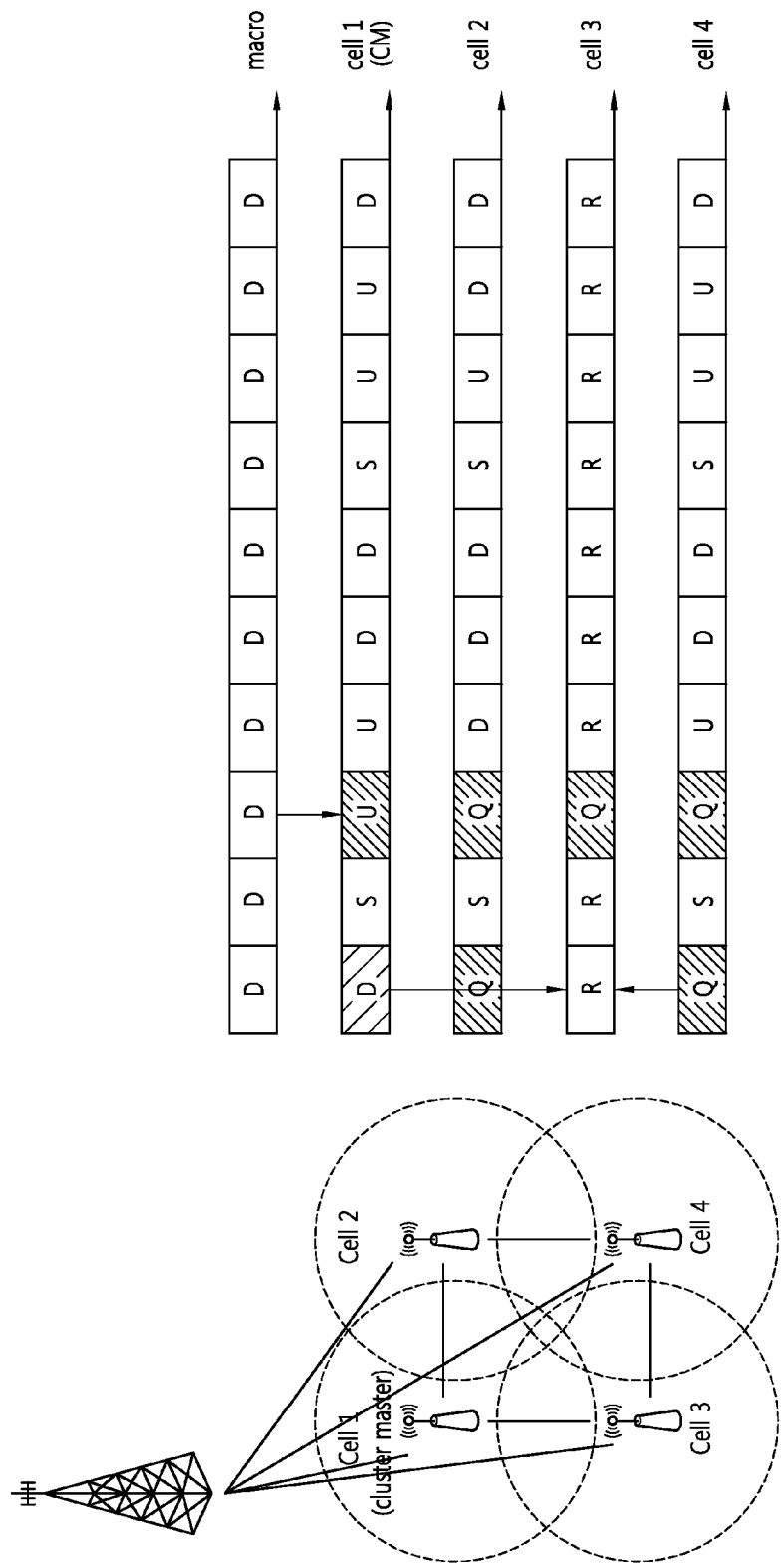
FIG. 7 shows another example of performing synchronization which the present invention is applied.

FIG. 7 shows another example of performing synchronization which the present invention is applied. The FIG. 7 shows that the cluster master is in macro-coverage case which the present invention is applied.

Referring to FIG. 7, when a cluster master is connected to the macro-cell, in this case, small cells are synchronized for the macro-cell to support dual connectivity and other functions for UEs.

The cluster master, in additional to a set of subframes used for network synchronization within the cluster, may indicate the set of subframes where it shall perform tracking from the macro cell to support this. For example, if the cluster master performs tracking at 3rd subframe as shown the FIG. 7 in every 2 radio frames, it shall inform the periodicity and the offset of synchronization subframes to the cells within the cluster. At least first-tier nodes may be silent in those subframes to allow better tracking performance at the cluster master. Other cells within the cluster may select to be silent as well. The silent subframe can be designated and shared by the cluster master to the cells within the cluster. Herein, scell configuration includes information of the silent subframe so that the cluster master receives synchronization information more efficiently from the macro cell.

Figure 8:
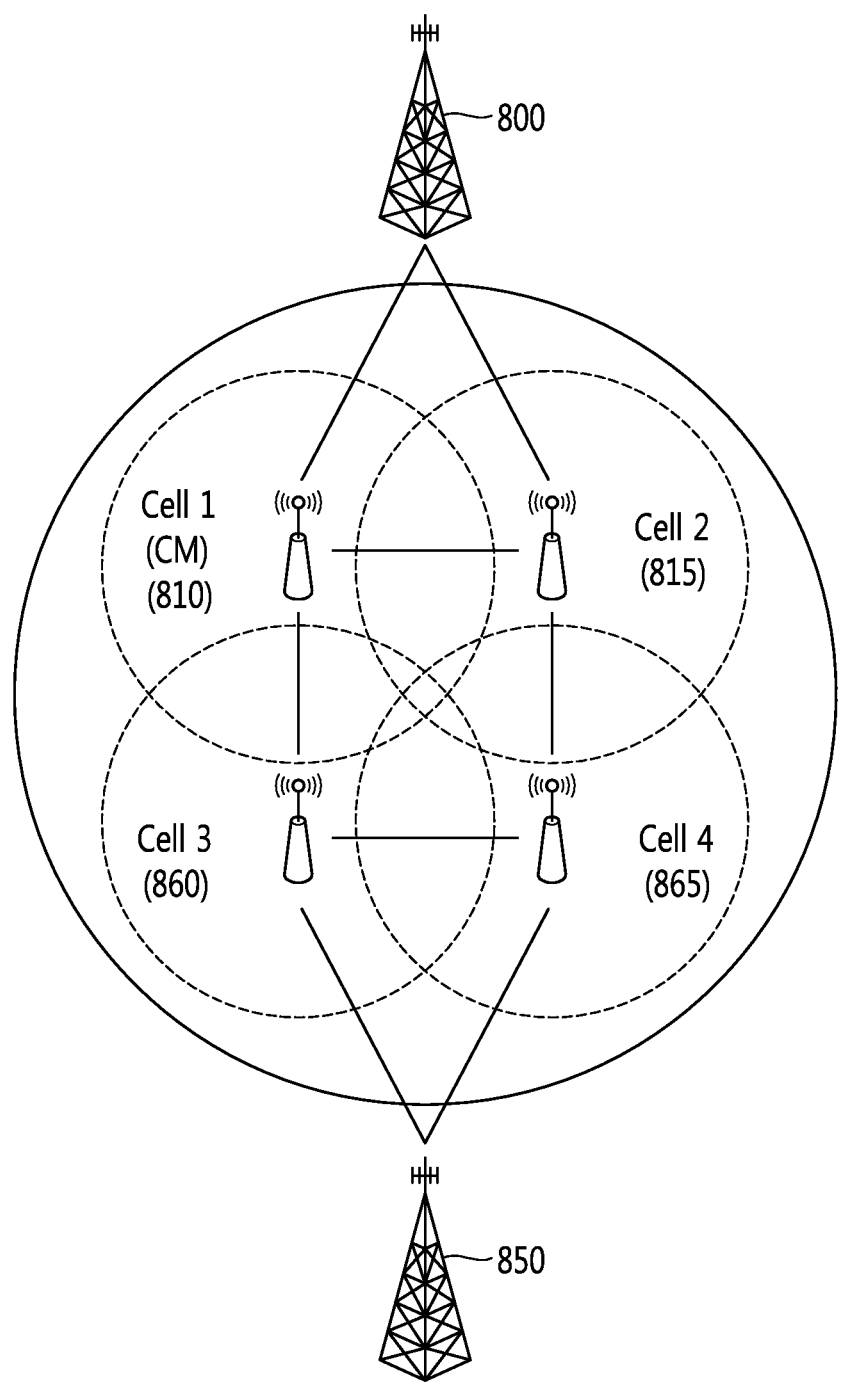
FIG. 8 shows another example of performing synchronization which the present invention is applied.

FIG. 8 shows another example of performing synchronization which the present invention is applied.

Referring to FIG. 8, when clusters are belonging to more than one more macro cells, it can be considered a frequency list, priority list or a source cell frequency indication via the macro cell. More specifically, a set of center frequency (priority list) per time synchronization and frequency synchronization can be indicated by the macro cell respectively where the frequencies in the list would be searched first with the priority order for time/frequency tracking separately. One example would be that the macro frequency can be used as the highest priority for frequency tracking whereas the small cell frequency can be used as the highest priority for time tracking. Furthermore, the list can also indicate the source eNB ID(s) where the target eNB should first discover for network listening. For example, cells within a small cell cluster can be configured with the same macro eNB ID regardless of its coverage and thus it can perform synchronization using the same source eNB.

In this case, if macro cell operates in FDD mode, two different macro cells may not be synchronized each other. In terms of synchronization within a cluster, two approaches can be possible. One is to perform network synchronization for the macro-cell where the cluster master is associated with. Since cluster master (cell 1) is associated with MeNB1 (800), the cluster master is synchronized for MeNB1 (800). Another example is not to perform network synchronization within a cluster. Rather, each small cell performs network synchronization for its associated macro cell. In the example, cell 3 and cell 4 are synchronized with MeNB2 (850) and cell 1 and cell 2 are synchronized with MeNB1 (800). Also the MeNB1 (800) and MeNB2 (850) are connected with X2 interface, they can share and control synchronization timing and pattern for the connected cells in a corresponding small cluster.

Alternative approach is to perform network synchronization within the cluster regardless of the associated with the macro cell. In this case, cluster master initiates the network synchronization same as to the case 1.

Figure 9:
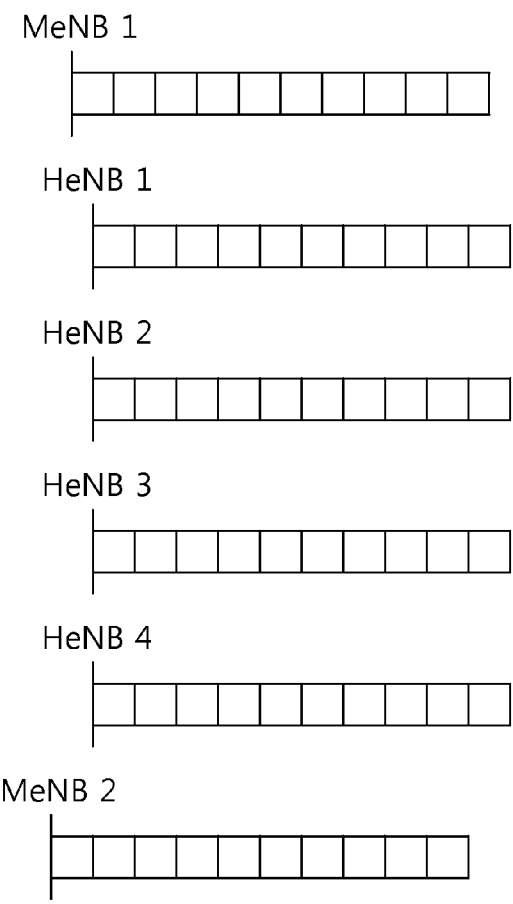
FIG. 9 and FIG. 10 show examples of aligning timing which the present invention is applied.
Figure 9:
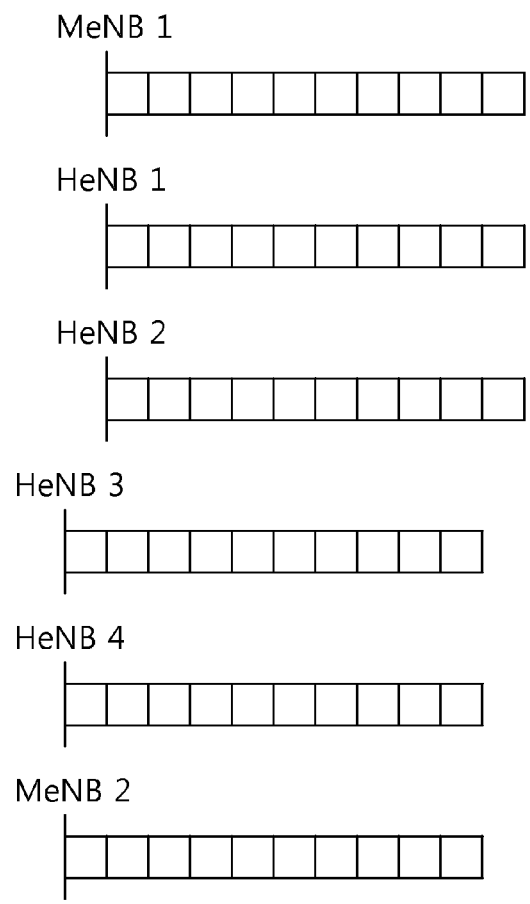
Figure 10:
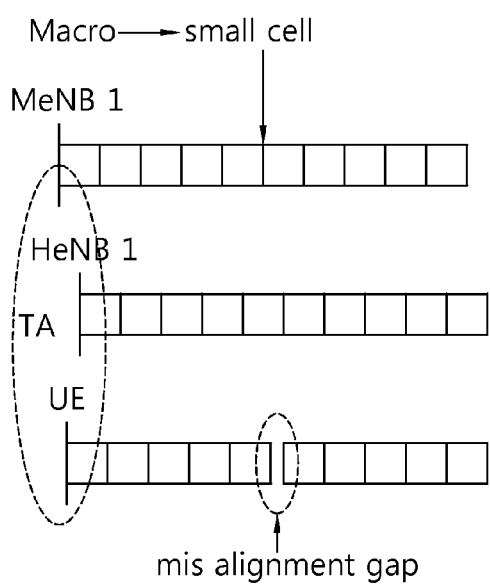
Figure 10:
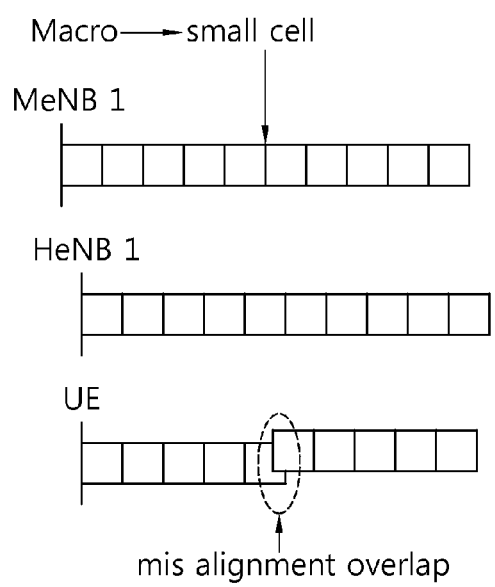

FIG. 9 and FIG. 10 show examples of aligning timing which the present invention is applied.

Firstly, Synchronization of cells within the cluster (a) is described. When a UE supports dual connectivity is assumed e.g., a UE is connected to cell1 as HeNB1 and MeNB1, depending on the frequency each node is operating, a few considerations are necessary. Or, if the UE is not capable of carrier aggregation with more than one CC, the UE may be supported for dual connectivity via TDM fashion, i.e., communicate with macro cell at T1 and communicate with small cell at T2. In those cases, misalignment between macro and small cell may lead some issues in the UE in terms of switching between macro and small cell.

As shown in FIG. 10(*a*), if a UE switches between macro and small cell due to its lack of CA capability, gap or overlap period due to misalignment shall be accounted for synchronization.

When a UE is configured with dual connectivity, it may calculate gap/overlap of misalignment based on TA configuration which may be informed to the both macro and small cell so that proper scheduling is planned at switch. For example, to address the overlap portion, the last few symbols of the subframe where overlap occurs can be punctured or a UE may assume that it may not receive/transmit any data during that overlap period or the first a few symbols of the subframe where the overlap occurs. Besides, SFN offset between macro and small cell shall be informed to the UE.

Secondly, the synchronization with a macro cell which is associated with is described.

If the small cell is synchronized with the associated with macro cell where macro cells are not synchronized, misalignment among small cells within a cluster may bring some issues especially with TDD mode. As below, interference coordination among small cells are not tightly managed due to timing misalignment. Also, when a UE switches among small cells, gap or overlap shall be considered as well shown (b).

Figure 11:
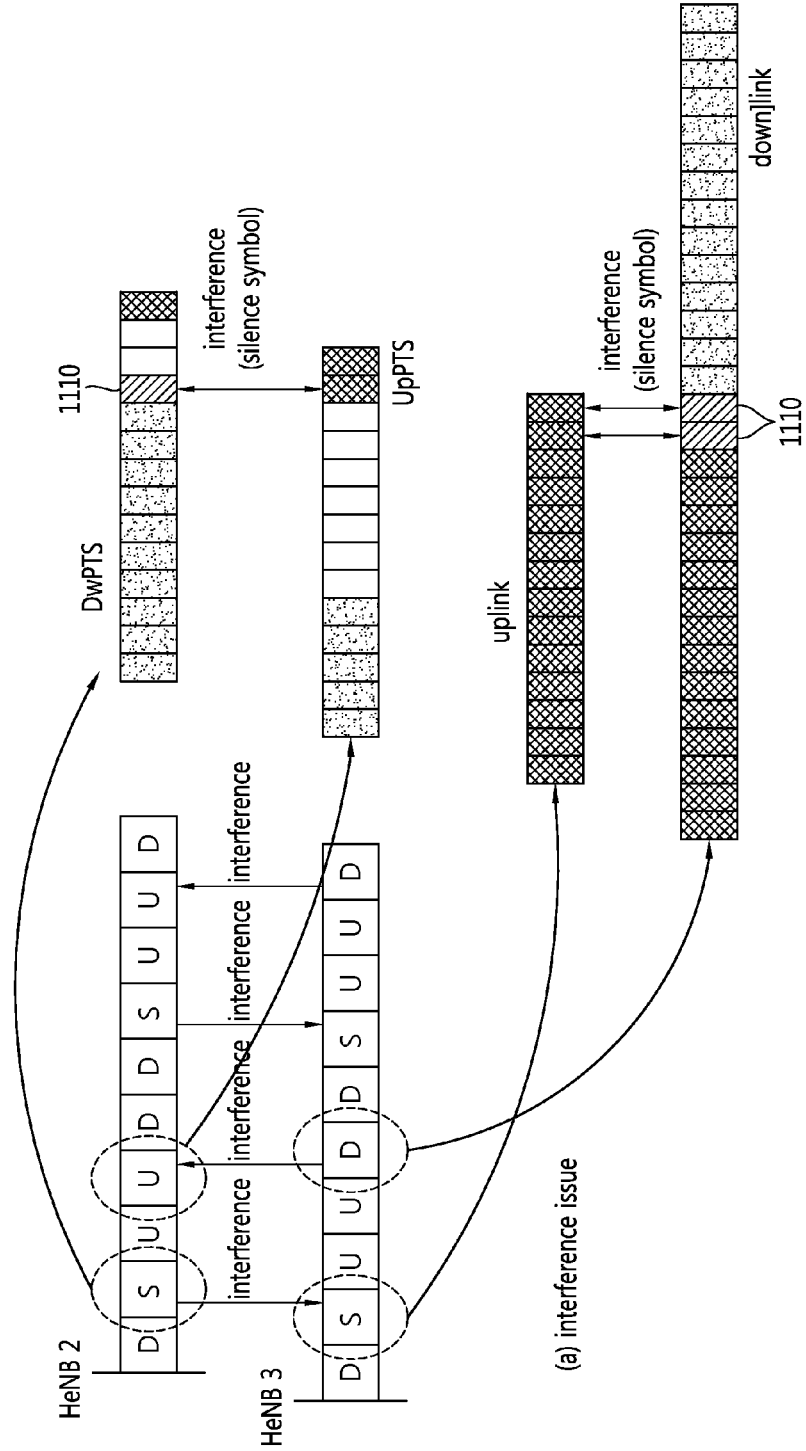
FIG. 11 shows an example of applying timing advance which the present invention is applied.

FIG. 11 shows an example of applying timing advance which the present invention is applied.

Referring to FIG. 11, either at least among cells within a cluster may be guaranteed to be synchronized to handle interference. Or, the overlap portion where heavy interference is expected can be signaled via backhaul so that each small cell uses lower power or not use those overlapped OFDM symbols for downlink transmission to minimize the interference.

Another approach is to use different timing advance values which are equal to the shifted OFDM symbol duration per each cell. The TA value can be signaled via SIB so that UE may be able to use the assigned TA value even from PRACH transmission. Legacy UEs may however use the TA=0 as it may not understand pre-allocated TA value.

For example, HeNB2 may use TA=two OFDM symbol duration to protect downlink of HeNB3. The information may be transmitted to the UEs to indicate silent OFDM symbols or a reduced power OFDM symbols. This information may be exchanged among cells which are interfered each other only e.g., HeNB2 and HeNB3 in the example. To support legacy UE without impact, those subframes where silent or the power reduced OFDM symbols are decided will be configured as MBSFN subframes if possible. If those subframes are not MBSFN-capable subframes e.g., #0/#1 subframe, then ABS-like scheme is used in those OFDM symbols i.e., only CRS is transmitted in those OFDM symbols and/or reduced power PDSCH is used for advanced UEs and PDSCH for a legacy UE is not scheduled in that subframe.

Figure 12:
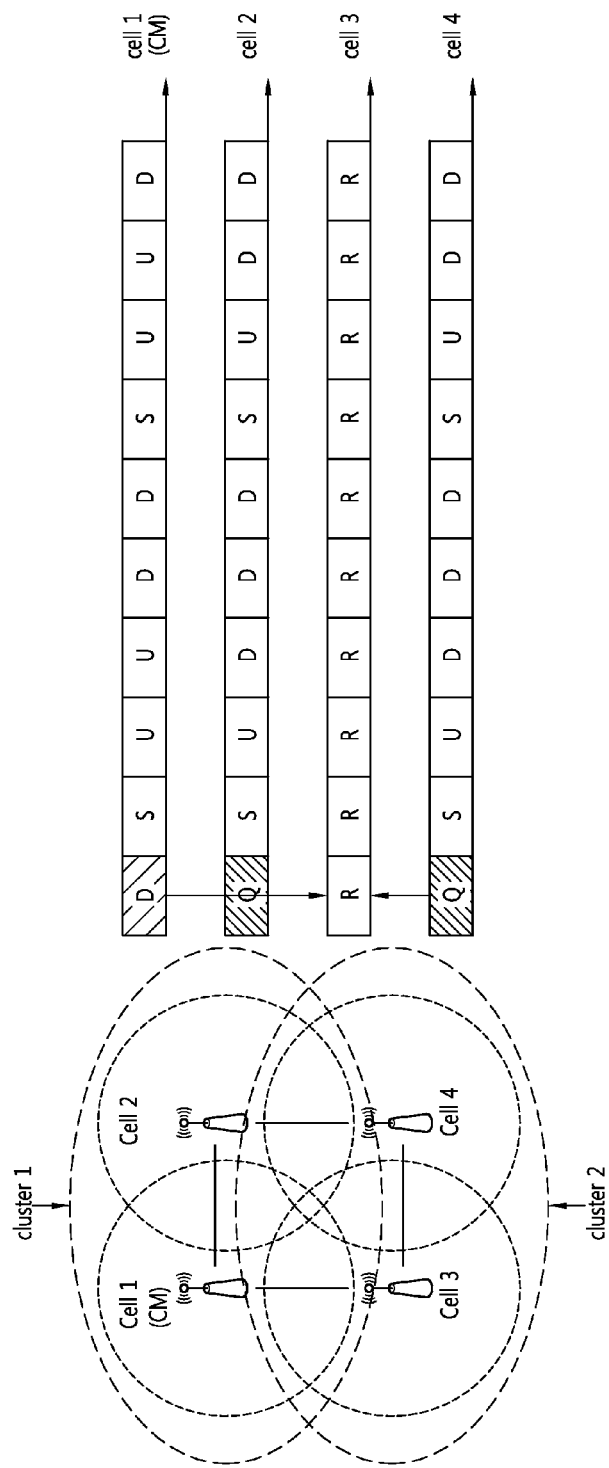
FIG. 12 shows an example of a network synchronization among multiple small cell clusters which the present invention is applied.

FIG. 12 shows an example of a network synchronization among multiple small cell clusters which the present invention is applied.

Referring to FIG. 12, if more than one small cell clusters are within radio range, synchronization based on network listening may need further handling the cases of misalignment between small cell cluster masters. For example, if two cluster masters (cell 1 and cell 4) are within proximity with not aligned timing, asynchronous timing among two clusters would lead interference issue shown.

To mitigate the interference, small cell cluster masters may perform network synchronization among themselves by synchronization techniques including network listening. In this case, the cluster master with lower cell ID or lower cluster ID or assigned by the network with higher priority may become a master for the synchronization. If this occurs, a cluster master may indicate the synchronization master to its cluster member cells so that it can perform necessary hierarchical network synchronization. For example, if cluster ID is used for selecting the synchronization master, cell1 is selected for the synchronization which will be forwarded to the cell 3 by cell 4 (CM of cluster 2). Once it has received the change of synchronization master, cell 3 performs necessary synchronization updates. If cell 3 has any active UEs, it may detach all the UEs before resynchronization with cell1 or put all the UEs in the DRX before resynchronization.

When a cluster master detects another cluster master in its vicinity, it may decide whether to combine two clusters within one TDD domain or keep the separate TDD domain based on Cluster size. If there are more than k cells in either cluster, combination may not be attempted e.g., k=10. Also, a number of UEs can be one of conditions. If there are more than m users in either cluster, combination may not be attempted, the m can be set as 100. Or a number of hops from the synchronization master can be applied. When synchronization master is more than 1 hops away from cluster master, combination may not be attempted, e.g., 1=3. Other metrics may be used to determine whether to combine or split the TDD domain among multiple clusters.

To support this, among cluster masters of each cluster shall exchange the information of cluster size, number of users, maximum hop from the synchronization master, the cell ID of cluster master, cluster ID, etc. Alternatively, Macro may determine the priority to decide the clock source or original source eNB. Moreover, the synchronization master shall broadcast synchronization period, offset, and necessary information for network synchronization update to the cells within the same TDD domain (i.e., synchronized with itself).

Furthermore, a UE can be assisted with the network listening. There are cases where over-the-air interface between macro and small cell cluster or between small cells may not be available due to channel environments and/or interferences and/or obstacles. In this case, if GPS or other higher layer based network synchronization schemes are not realistic, still network based listening approach shall be used. In this case, the UE may help the network synchronization.

Figure 13:
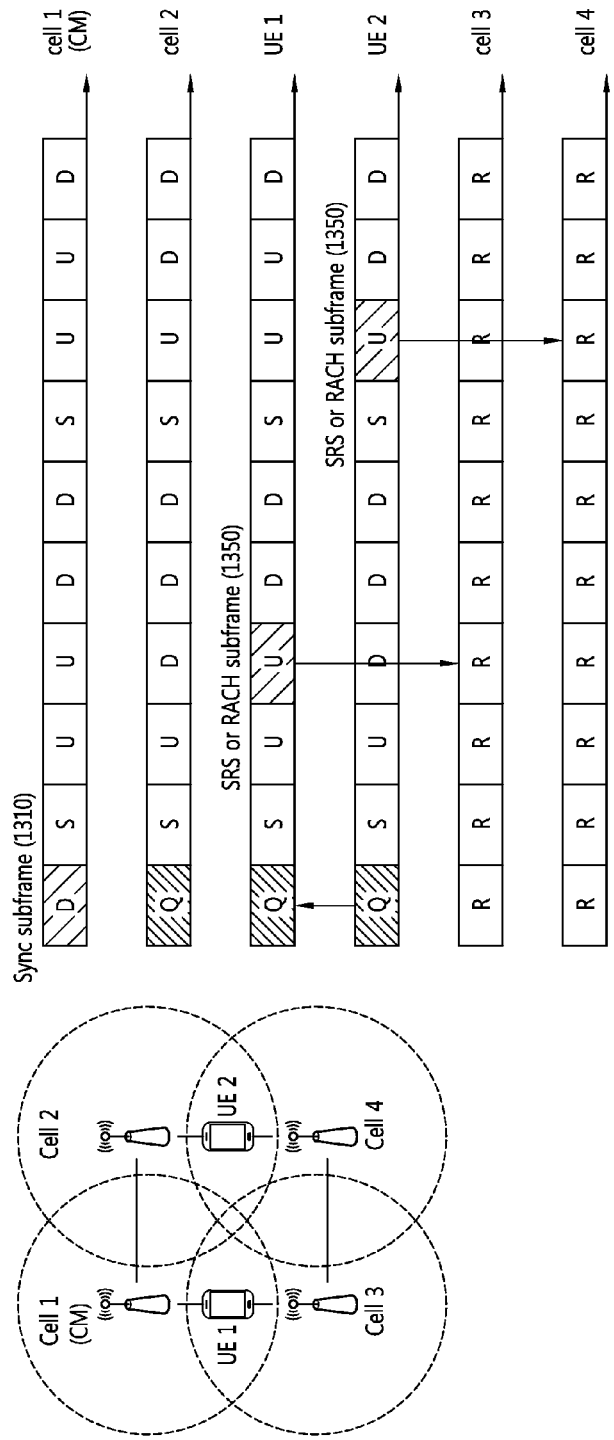
FIG. 13 shows an example of a network synchronization based on UE uplink signals which the present invention is applied.

FIG. 13 shows an example of a network synchronization based on UE uplink signals which the present invention is applied.

Referring to FIG. 13, uplink signals (1350) from a UE may be used for network synchronization. In this case, timing advance that each UE used shall be forwarded via backhaul interface to cells so that each cell can extract or add TA accordingly for tracking purpose. Also to allow successful decoding of uplink signals, SRS configuration or RACH configuration of UEs per each cell may be exchanged via backhaul interface as well. Or, UE may transmit PRACH for network synchronization purpose upon request which is initiated by PDCCH order. This uplink PRACH resource used for network synchronization should be protected by interference coordination among small cells via backhaul interface. Once a cell performs network synchronization using a UE's uplink signal, a UE may be explicitly configured with periodic RACH or SRS for network synchronization. Moreover, to disable uplink transmission from UEs in silence subframes for network synchronization, explicit uplink disabling signals on those subframes can be configured to UEs either via UE-specific higher layer signaling or cell-specific signaling.

If RACH is used for network synchronization, UE can be configured with periodic PRACH transmission by higher layer signaling with preamble format, resource, and timing.

When cluster master is not reachable to the macro cell, it can perform network synchronization within the cluster or it may update its synchronization with UE assistance which is connected to the macro cell and the cluster master can hear the uplink transmission from the UE.

To support this, a small cell may transmit the request to identify any UE which is connected to the macro cell via higher layer. Upon receiving this request, if a UE is connected to the macro cell, it shall response with PRACH with predetermined preamble and resource.

Further, a cluster master may turn off and go into off state to save energy. Before it goes to off state, cluster master shall determine a new cluster master within the cluster and broadcast the information to the cluster. If the cluster master is a synchronization master for another cluster, it shall notify all cluster masters within the same TDD domain. Note that the TDD domain is determined as a set of cells which shares the same synchronization master. A new cluster master or sync master may broadcast the information of synchronization period and offset if changes occur. To minimize the impact, a new cluster master with the largest number of neighbor cells i.e., cells reachable in one-hop may be selected as a new cluster master. To enable this, each cell may exchange the number of neighbor cells to the cluster master. If there are active UEs attached to the cluster master shall be handed-over to the new cluster master before turning-off.

Lastly, Re-sync upon wake-up is described. A cell upon waking up from sleep would reacquire the synchronization. Either it first acquires the synchronization master via back-haul interface first and attempts to re-sync or it may try initial synchronization.

Figure 14:
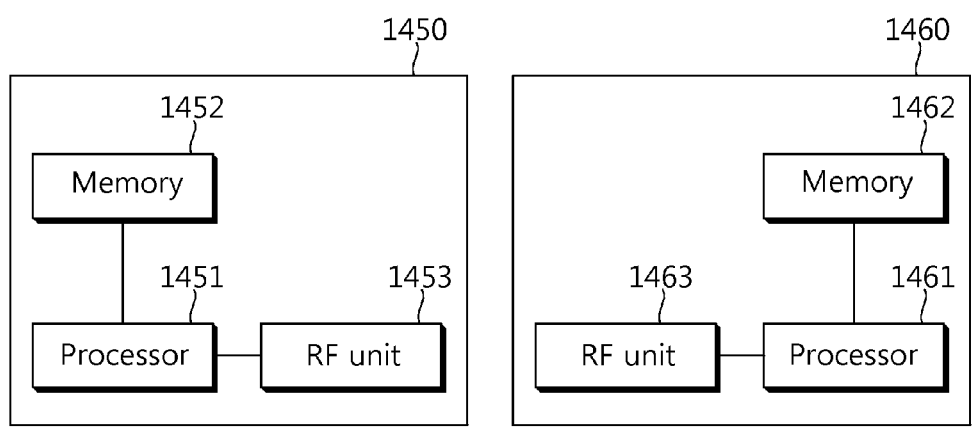
FIG. 14 shows a block diagram showing a wireless communication system according to an exemplary embodiment of the present invention.

FIG. 14 is a block diagram showing a wireless communication system according to an embodiment of the present invention.

A BS 1450 includes a processor 1451, a memory 1452, and a radio frequency (RF) unit 1453. The memory 1452 is coupled to the processor 1451, and stores a variety of information for driving the processor 1451. The RF unit 1453 is coupled to the processor 1451, and transmits and/or receives a radio signal. The processor 1451 implements the proposed functions, procedures, and/or methods. In the embodiments of FIG. 2 to FIG. 13, the operation of the BS can be implemented by the processor 1451.

Especially, the processor 1451 may configure one or more cells with different frequencies, for this invention the processor 1451 configures the cells to support Semi-Persistent Scheduling, TTI-bundling, HARQ-ACK procedures. The processor 1451 may configure and transmit a configuration including a small cell as a relay node, the information related to the relay node (e.g., cell ID, scheduling information, etc) to the UE so that the UE can properly receive the data from the relay node. It also includes ACK/NACK subframe configuration for the data transmission.

Also the processor 1451 may configure synchronization information including a set of subframes in which a discovery signal or a synchronization signal is transmitted, and a muting pattern which is changed according to a downlink (DL)/uplink(UL) configuration of a corresponding cell, the DL/UL configuration for a macro cell and small cells in a small cell cluster, the DL/UL configuration is further set for a master cell in the small cell cluster, the DL/UL configuration is configured for the cells or shared the between the macro cell and one of the small cells to perform the synchronization. And then processor 1451 may configure a subframe pattern for a discovery signal or synchronization signal, and a stratum level including a network level for performing a network sync-up, the stratum level includes a number of a hopping time to deliver the synchronization information.

When the processor 1451 configures the subframe pattern, the subframe pattern includes an offset between a cell to be set (a cell to be synchronized) and a cell to set (a reference cell as a sync cell), period of the a corresponding cell, and silent subframe to listen the macro or the master cell of the sync cell to perform synchronization better. The information of synchronization includes a frequency list, a priority list or a source cell frequency indication to perform synchronization among the one or more macro cells, a macro cell and a master cell in small cell cluster, or sets of small cell clusters. Also the processor 1451 configures up/down power offset to perform synchronization better for a corresponding cell, and gap/overlap of misalignment based on TA configuration. The processor 1451 can configure cell on/off to save the UE's energy saving, it can be also signaled to the UE to perform the better cell synchronization.

The information of synchronization is configured by RRC configuration, Scell configuration, or TM mode configuration. Or, when those configurations are already set in the node in UE, the information including an indication to operate a specific cell is indicated by L1 signaling.

The processor 1451 can perform a RACH procedure and data transmission via the selected cell by using a corresponding cell ID. And the processor 1451 may also configure CRS patterns by the small cell ID or PSS/SSS each, the CRS patterns includes a start subframe, subframe set, and RB of the CRS in a radio frame.

In other words, the processor 1451 may configure and transmit the configuration using a serving cell (Scell) configuration, a hand-over configuration, a dual connectivity configuration, a relay node configuration, or a radio resource control (RRC) configuration via a primary cell (Pcell or master cell) of macro cell. Further the processor 1451 may configure proper TDD configuration for the macro cell and small cell as a relay node each.

The wireless device 1460 includes a processor 1461, a memory 1462, and an RF unit 1463. The memory 1462 is coupled to the processor 1461, and stores a variety of information for driving the processor 1461. The RF unit 1463 is coupled to the processor 1461, and transmits and/or receives a radio signal. The processor 1461 implements the proposed functions, procedures, and/or methods. In the embodiments of the FIG. 2 to FIG. 13, the operation of the UE can be implemented by the processor 1461.

Especially, the processor 146 may configure one or more cells with different frequencies, for this invention the processor 146 configures the cells to support Semi-Persistent Scheduling, TTI-bundling, HARQ-ACK procedures. The processor 1461 may configure and receive a configuration of serving cells including a macro cell and a small cell as a relay node, the information related to the relay node (e.g., cell ID, scheduling information, etc) supports that the UE can properly receive the data from the relay node of the small cell and the macro cell. It also includes ACK/NACK subframe configuration for the data transmission. The processor 1461 may also calculate ACK/NACK timing after receiving the data based on the ACK/NACK subframe configuration.

Also the processor 1461 may configure synchronization information including a set of subframes in which a discovery signal or a synchronization signal is transmitted, and a muting pattern which is changed according to a downlink (DL)/uplink(UL) configuration of a corresponding cell, the DL/UL configuration for a macro cell and small cells in a small cell cluster, the DL/UL configuration is further set for a master cell in the small cell cluster, the DL/UL configuration is configured for the cells or shared the between the macro cell and one of the small cells to perform the synchronization. And then processor 1461 may configure a subframe pattern for a discovery signal or synchronization signal, and a stratum level including a network level for performing a network sync-up, the stratum level includes a number of a hopping time to deliver the synchronization information.

When the processor 1461 configures the subframe pattern, the subframe pattern includes an offset between a cell to be set (a cell to be synchronized) and a cell to set (a reference cell as a sync cell), period of the a corresponding cell, and silent subframe to listen the macro or the master cell of the sync cell to perform synchronization better. The information of synchronization includes a frequency list, a priority list or a source cell frequency indication to perform synchronization among the one or more macro cells, a macro cell and a master cell in small cell cluster, or sets of small cell clusters. Also the processor 1461 configures up/down power offset to perform synchronization better for a corresponding cell, and gap/overlap of misalignment based on TA configuration.

The processor 1461 can configure cell on/off to save the UE's energy saving, it can be also signaled to the UE to perform the better cell synchronization. The information of synchronization is configured by RRC configuration, Scell configuration, or TM mode configuration. Or, when those configurations are already set in the node in UE, the information including an indication to operate a specific cell is indicated by L1 signaling.

Also the processor 1461 may configure and receive discovery signals or PSS/SSS scrambled with the small cell ID. And then processor 1461 may perform a RACH procedure and data transmission via the selected cell by using a corresponding cell ID. And the processor 1461 may also configure CRS patterns by the small cell ID or PSS/SSS each, the CRS patterns includes a start subframe, subframe set, and RB of the CRS in a radio frame.

In other words, the processor 1461 may configure and transmit the configuration using a serving cell (Scell) configuration, a hand-over configuration, a dual connectivity configuration, a relay node configuration, or a radio resource control (RRC) configuration via a primary cell (Pcell or master cell) of macro cell. Further the processor 1461 may configure proper TDD configuration for the macro cell and small cell as a relay node each.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for performing synchronization in a wireless communication system, the method performed by a wireless device and comprising:
   acquiring information including a set of subframes in which a discovery signal or a synchronization signal is transmitted, a muting pattern which is changed according to a downlink (DL)/uplink(UL) configuration of a corresponding cell, and a timing advance configuration between a synchronization source cell and a configured cell;
   receiving the discovery signal or the synchronization signal from a cell based on the information;
   calculating a misalignment gap or overlap based on the timing advance; and
   performing synchronization based on the calculated gap or overlap and the received discovery signal or the synchronization signal,
   wherein the information is transmitted to cells via an air interface from the synchronization source cell.

2. The method of claim 1, wherein the information further includes:
   a frequency list including frequencies for a first cell and a second cell,
   a priority list including priorities for the first cell and the second cell, or
   a synchronization source cell frequency indication to indicate the source cell, for performing synchronization of one or more cells including the cell.

3. The method of claim 1, wherein the information further includes:
   a stratum level including a number of hops to route the information from the source cell to a destination cell.

4. The method of claim 1, wherein the information further includes:
   the muting pattern having a silent subframe to control at least one of a subframe for the discovery signal and the synchronization signal of other cells.

5. The method of claim 1, wherein the information further includes:
   cell state information to indicate where a cell does not transmit the discovery signal or a synchronization signal to indicate a cell off state, or where the cell transmits the discovery signal or the synchronization signal to indicate a cell on state.

6. The method of claim 1, further comprising:
   configuring, by a master cell, DL/UL configurations of the cells within a cluster for performing synchronization, or
   controlling a number of hops to route the information from the macro cell to a destination cell.

7. The method of claim 6, further comprising:
   sharing the information between sets of small cluster groups;
   changing a synchronization source cell to indicate a source cell for performing synchronization among the macro cell and a master cell of sets of small cluster groups of one or more macro cells.

8. A wireless device for performing data transmission in a wireless communication system, the wireless device comprises:
   a transceiver for transmitting and receiving a radio signal; and
   a processor operatively coupled to the transceiver, wherein the processor:
   acquires information including a set of subframes in which a discovery signal or a synchronization signal is transmitted, a muting pattern which is changed according to a downlink (DL)/uplink(UL) configuration of a corresponding cell, and a timing advance configuration between a synchronization source cell and a configured cell;
   controls the transceiver to receive the discovery signal or the synchronization signal from a cell based on the information;

calculates a misalignment gap or overlap based on the timing advance;
performs synchronization based on the calculated gap or overlap and the received discovery signal or the synchronization signal,
wherein the information is transmitted to cells via an air interface from the synchronization source cell.

9. The wireless device of claim 8, wherein the information includes a frequency list including frequencies for a first cell and a second cell, a priority list including priorities for the first cell and the second cell, or a synchronization source cell frequency indication to indicate the source cell, for performing synchronization of one or more cells including the cell.

10. The wireless device of claim 8, wherein the information including a stratum level including a number of hops to route the information from the source cell to a destination cell.

11. The wireless device of claim 8, wherein the information includes cell state information to indicate where a cell does not transmit the discovery signal or a synchronization signal to indicate a cell off state, or where the cell transmits the discovery signal or the synchronization signal to indicate a cell on state.

12. The wireless device of claim 8, wherein the processor further controls the transceiver to receive DL/UL configurations of the cells within a cluster for performing synchronization to reconfigured by a master cell, and a number of hops to route the information from the macro cell to a destination cell.

13. The wireless device of claim 8, wherein the information w is shared between sets of small cluster groups and changes a synchronization source cell to indicate a source cell for performing synchronization among the macro cell and a master cell of sets of small cluster groups of one or more macro cells.

* * * * *